United States Patent
Little et al.

(10) Patent No.: US 7,633,721 B1
(45) Date of Patent: Dec. 15, 2009

(54) DISK DRIVE WITH AN ACTUATOR LATCH HAVING FIXED, LATCHING, AND LATCH ARM PORTIONS BEING A SINGLE COMPONENT

(75) Inventors: Aaron D. Little, Campbell, CA (US); Lidu Huang, Danville, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 696 days.

(21) Appl. No.: 11/345,445

(22) Filed: Feb. 1, 2006

(51) Int. Cl.
*G11B 5/54* (2006.01)
*G11B 21/22* (2006.01)

(52) U.S. Cl. .................................. 360/256.2
(58) Field of Classification Search ....... 360/256–256.6
See application file for complete search history.

(56) References Cited

U.S. PATENT DOCUMENTS

| | | | |
|---|---|---|---|
| 1,729,968 A | 10/1929 | Sargent | |
| 3,375,546 A | 4/1968 | Peterson | |
| 5,703,735 A | 12/1997 | Bleeke | |
| 5,793,572 A * | 8/1998 | Lalouette et al. | 360/256.1 |
| 6,118,636 A | 9/2000 | Hatch et al. | |
| 6,134,077 A * | 10/2000 | Misso et al. | 360/256 |
| 6,163,440 A | 12/2000 | Takahashi et al. | |
| 6,185,074 B1 * | 2/2001 | Wang et al. | 360/256.4 |
| 6,215,628 B1 | 4/2001 | Boutaghou | |
| 6,327,119 B1 | 12/2001 | Barina et al. | |
| 6,400,533 B1 * | 6/2002 | Liu et al. | 360/256.5 |
| 6,507,461 B1 | 1/2003 | Kimura et al. | |
| 6,529,349 B1 | 3/2003 | Byun et al. | |
| 6,535,359 B1 | 3/2003 | Boutaghou | |
| 6,731,468 B2 | 5/2004 | Williams et al. | |
| 2003/0035246 A1 | 2/2003 | Byun et al. | |
| 2003/0086210 A1 | 5/2003 | Miyajima | |
| 2003/0147179 A1 * | 8/2003 | Hashizume et al. | 360/256.4 |
| 2004/0141256 A1 * | 7/2004 | Hong et al. | 360/256 |
| 2004/0145832 A1 | 7/2004 | Kanada et al. | |

* cited by examiner

*Primary Examiner*—Andrea L Wellington
*Assistant Examiner*—Adam B Dravininkas
(74) *Attorney, Agent, or Firm*—Barcelo & Harrison, LLP

(57) ABSTRACT

A disk drive includes a disk drive base and an actuator that is rotatably coupled to the disk drive base. The actuator has an axis of rotation. The disk drive further includes a latch. The latch includes a fixed portion that is firmly coupled to the disk drive base, and a latching portion. The latch further includes a latch arm portion connecting the latching portion to the fixed portion. The latch arm portion includes a hinge region. The latch arm portion is thinner in a direction normal to the axis of rotation in the hinge region than the latch arm portion is outside of the hinge region. The latch arm portion, the latching portion, and the fixed portion are a single component having material continuity rather than an assembly of subcomponents.

14 Claims, 6 Drawing Sheets

DISK DRIVE WITH AN ACTUATOR LATCH HAVING FIXED, LATCHING, AND LATCH ARM PORTIONS BEING A SINGLE COMPONENT

FIELD OF THE INVENTION

The present invention relates generally to disk drives, and in particular a disk drive with an actuator latch having fixed, latching, and latch arm portions being a single component.

BACKGROUND

The typical hard disk drive includes a head disk assembly (HDA) and a printed circuit board assembly (PCBA) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. In an optical disk drive, the head will typically include a mirror and objective lens for reflecting and focusing a laser beam on to a surface of the disk. The head stack assembly is controllably positioned in response to the generated servo control signals from the disk controller. In so doing, the attached heads are moved relative to tracks disposed upon the disk.

The spindle motor typically includes a rotatable spindle motor hub, a magnet attached to the spindle motor hub, and a stator. Various coils of the stator are selectively energized to form an electromagnetic field that pulls/pushes on the magnet, thereby imparting a rotational motion onto the spindle motor hub. Rotation of the spindle motor hub results in rotation of the attached disks.

The head stack assembly includes an actuator assembly, at least one head gimbal assembly, and a flex circuit assembly. A conventional "rotary" or "swing-type" actuator assembly typically includes an actuator having an actuator body. The actuator body has a pivot bearing cartridge to facilitate rotational movement of the actuator assembly. One or more actuator arms extend from the actuator body. Each actuator arm supports at least one head gimbal assembly that includes a head. An actuator coil is supported by the actuator body opposite the actuator arms. The actuator coil is configured to interact with one or more magnets, typically a pair, to form a voice coil motor. The printed circuit board assembly controls current passing through the actuator coil that results in a torque being applied to the actuator.

A latching mechanism may be provided to facilitate latching of the actuator in a parked position when the heads are not being used to interact with the tracks on the disk. In the parked position, the actuator is positioned with the heads either at an outer diameter (OD) or inner diameter (ID) of the disk. A crash stop coupled to the disk drive base is provided to limit rotation of the actuator in a given direction. The crash stop is configured to contact a portion of the actuator when the actuator is rotated in a given rotational direction. Another crash stop may be provided to limit actuator rotation in an opposite rotational direction. The latching mechanism may additionally function as one of the crash stops.

Disk drives have found an ever increasing utility for use in a small mobile electronic devices. Such devices may include laptop and hand-held computing devices, audio devices, audio/video devices, and personal electronic organizers, for examples.

Due to the portable nature of such small mobile electronic devices, there is an enhanced risk that the device may be subject to mechanical shock events. This may occur in the case where the device is dropped for example. During a mechanical shock event, the disk drive base may experience significant rotational acceleration that can cause a sudden relative rotation of the actuator. Such sudden relative rotation of the actuator may result in damage to the actuator, especially the attached head gimbal assemblies. The adjacent disk(s) may be impacted as well, which may result in loss of data. Various latch designs have attempted to secure the actuator during such mechanical shock events. However, many such designs have proven to be complex, costly or unreliable.

Accordingly, it is contemplated that there is need in the art for an improved actuator latch configuration.

SUMMARY

According to an aspect of the present invention, there is provided a disk drive. The disk drive includes a disk drive base. The disk drive further includes an actuator that is rotatably coupled to the disk drive base. The actuator has an axis of rotation. The disk drive further includes a latch. The latch includes a fixed portion that is firmly coupled to the disk drive base. The latch further includes a latching portion. The latch further includes a latch arm portion connecting the latching portion to the fixed portion. The latch arm portion includes a hinge region. The latch arm portion is thinner in a direction normal to the axis of rotation in the hinge region than the latch arm portion is outside of the hinge region. The latch arm portion, the latching portion, and the fixed portion all being a single component having material continuity rather than being an assembly of sub-components.

According to various embodiments, the fixed portion, the latching portion, and the latch arm portion may comprise a plastic material. The latch arm portion may have a height in the hinge region in a direction parallel to the axis of rotation and a nominal thickness in the hinge region in a direction orthogonal to the axis of rotation. The height may be at least five times the nominal thickness. The hinge region of the latch arm portion may have substantially greater bending stiffness about an axis parallel to the axis of rotation than about an axis normal to the axis of rotation.

In addition, the latch may include a biasing element coupled to the latch arm portion, magnetic interaction with the biasing element resulting in a biasing force. The biasing element may comprise a magnetic metal. The disk drive may further comprise a VCM magnet disposed adjacent the actuator. The biasing element magnetically interacts with the VCM magnet. The latching portion may be at a closer radial distance from the axis of rotation with the latch in an open position than it is in a closed position. The latching portion may be in the shape of a pin. The actuator may have a channel, and the latching portion may be disposed within the channel during rotation of the actuator with the latch in an open position. The latching portion may be radially beyond the channel in relation to the axis of rotation with the latch in a closed position. The disk drive may further comprise a latch post extending from the disk drive base, and the fixed portion may be coupled to the latch post. The fixed portion may be press-fit attached to the latch post. The latch post and the disk drive base may be a single component having material continuity as opposed to being an assembly of sub-components. The latch further may include a mass element. The mass element is formed of a material having a density greater than the fixed portion, the latch arm portion, and the latching portion. The latch may further include a crash stop, and the actuator may contact the crash stop with the actuator in an extreme rotational position. The crash stop, the hinge region, the latch arm portion, the latching portion, and the fixed portion may all be a single component having material continuity rather than being an assembly of sub-components.

DESCRIPTION OF THE PREFERRED EMBODIMENTS

Figure 1:
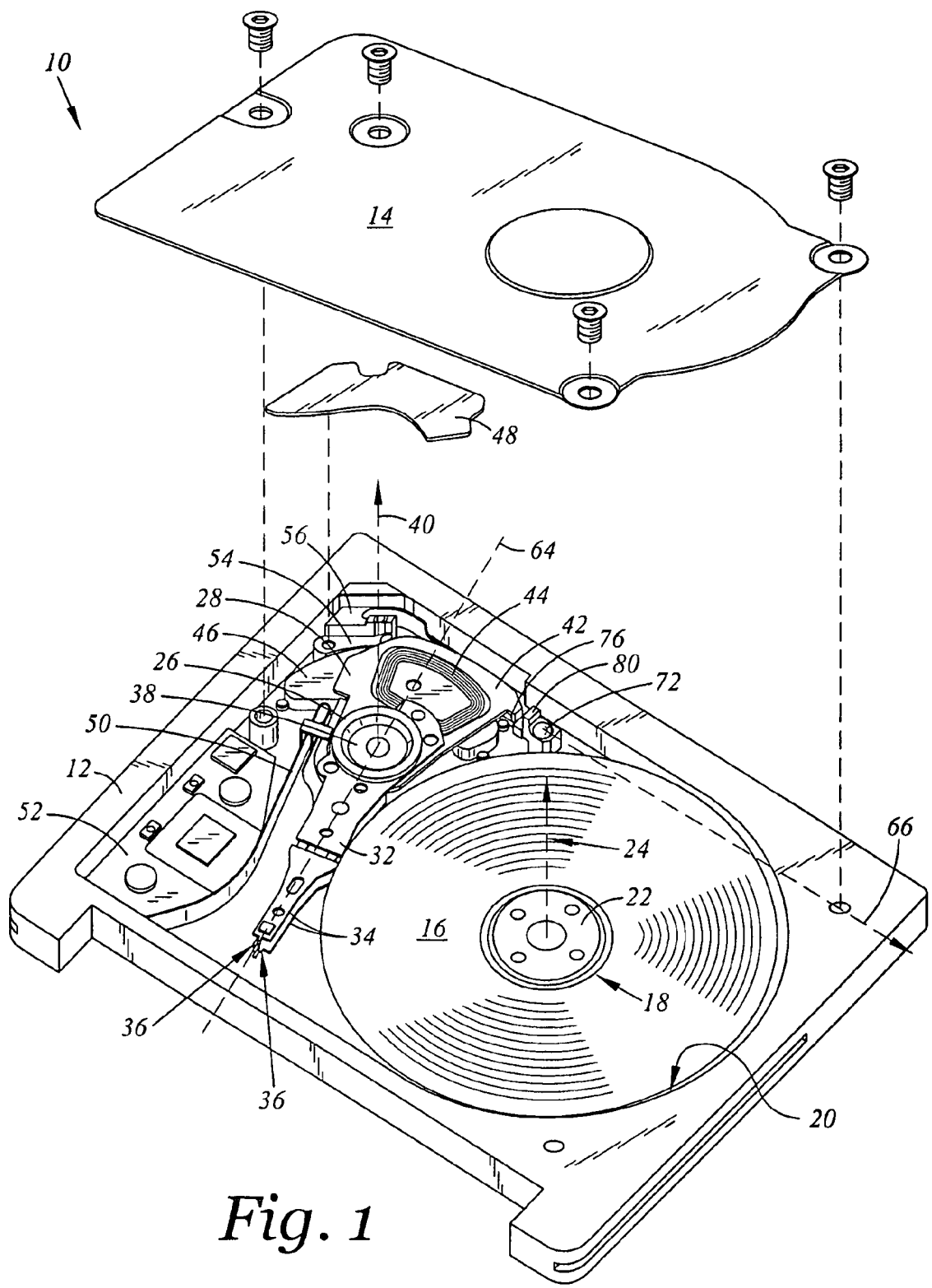
FIG. 1 is an exploded top perspective view of a disk drive including a latch and an actuator according to an embodiment of the present invention.

Referring now to FIG. 1, there is depicted an exploded perspective view of a disk drive 10 according to an embodiment of the present invention. The disk drive 10 includes a head disk assembly (HDA) and a printed circuit board assembly (PCBA) (not shown). The head disk assembly includes a disk drive housing having disk drive housing members, such as a disk drive base 12 and a cover 14. The disk drive base 12 and the cover 14 collectively house a disk 16. A single disk or additional disks may be utilized. The disk 16 includes an inner diameter (ID) 18 and an outer diameter (OD) 20. The disk 16 further includes a plurality of tracks for storing data. The disk 16 may be of a magnetic recording type of storage device, however, other arrangements such as optical recording may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body 30 and actuator arms 32 that extend from the actuator body 30. Distally attached to the actuator arms 32 are suspension assemblies 34. The suspension assemblies 34 respectively support heads 36. The suspension assemblies 34 with the heads 36 are referred to as head gimbal assemblies. It is contemplated that the number of actuator arms and suspension assemblies may vary depending upon the number of disks and disk surfaces utilized.

Each head 36 typically includes a transducer for writing and reading data. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In the embodiment shown, the actuator body 30 includes a bore, and the actuator 28 further includes a pivot bearing cartridge 38 engaged within the bore for facilitating the actuator body 30 to rotate between limited positions about an axis of rotation 40.

The actuator 28 further includes a coil support element 42 that extends from one side of the actuator body 30 opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned between the VCM magnet 46 and the VCM top plate 48 to form a voice coil motor for controllably rotating the actuator 28.

The head stack assembly 26 further includes a flex cable assembly 50 and a cable connector 52. The cable connector 52 is attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. A change in direction of the current through the coil 44 results in a change in direction of the torque applied to the actuator 28. It is contemplated that other magnet, VCM plate, coil and magnet support configurations may be utilized, such as a multiple coil arrangements, single or double VCM plates and a vertical coil arrangement.

Figure 2:
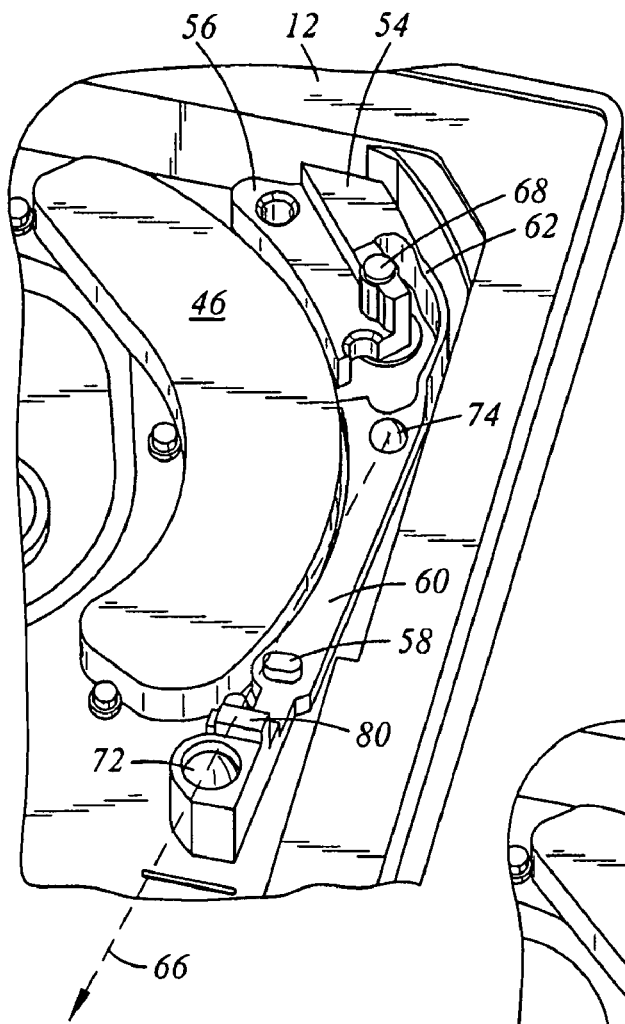
FIG. 2 is an enlarged top perspective view of a portion of a disk drive according to an embodiment of the present invention with a latch in an open position.
Figure 3:
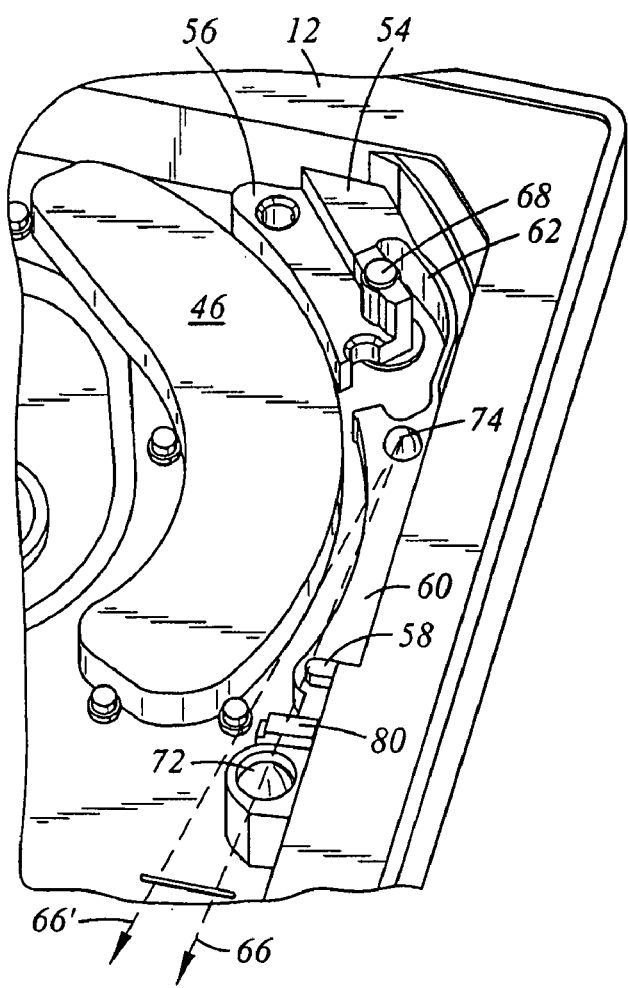
FIG. 3 is an enlarged top perspective view of a portion of the disk drive similar to that of FIG. 2, however, with the latch in a closed position.
Figure 4:
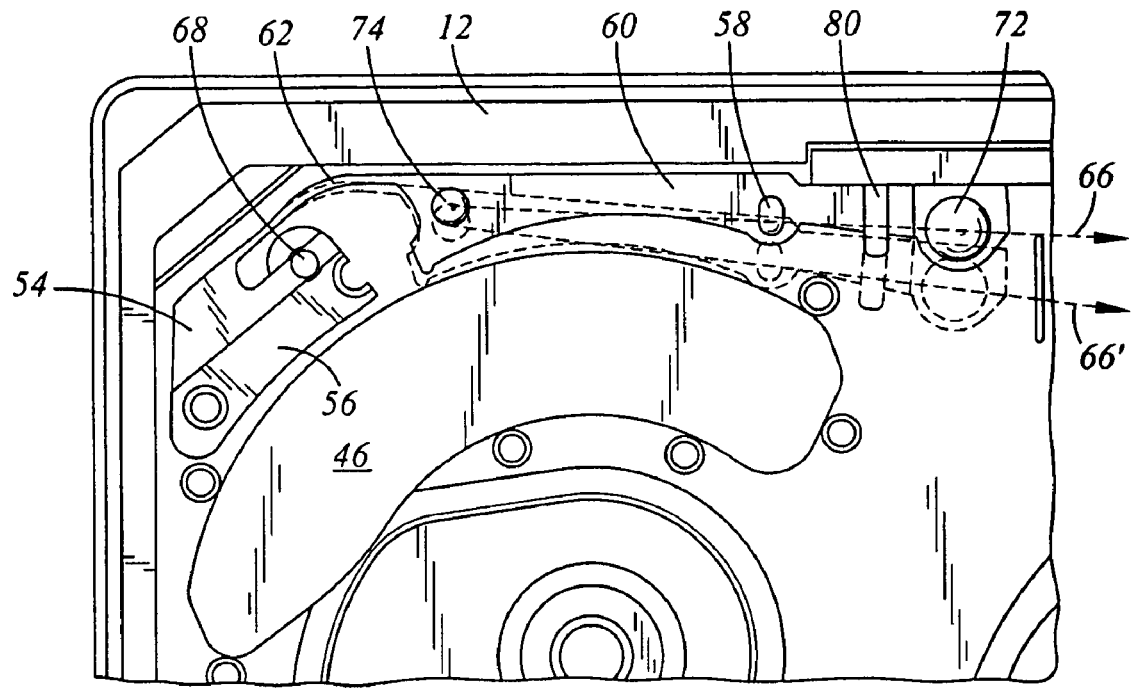
FIG. 4 is an enlarged top plan view of a portion of a disk drive according to an embodiment of the present invention with a latch in a closed position (and the latch in an open position shown in dashed lining)
Figure 5:
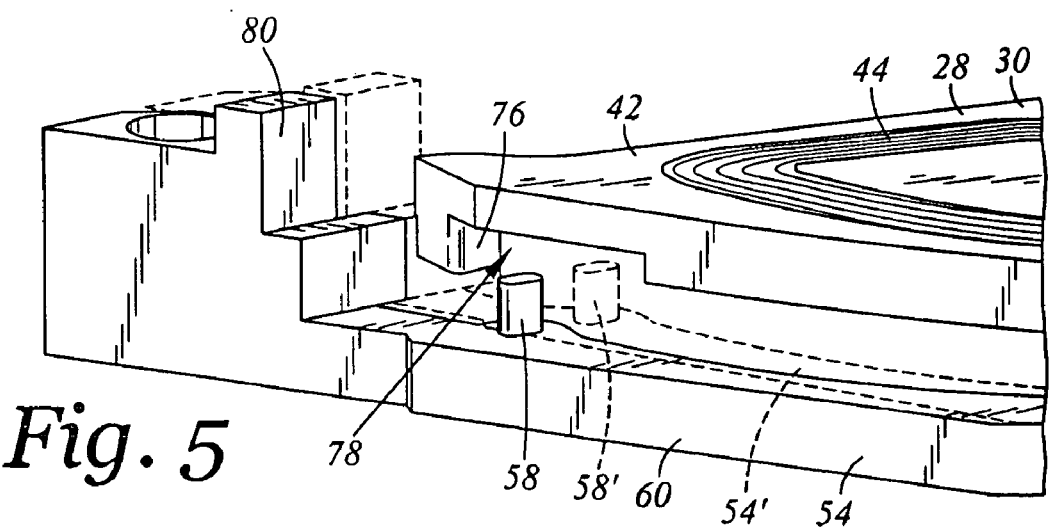
FIG. 5 is an enlarged top perspective view of a portion of the latch and a portion of the actuator of the disk drive according to an embodiment of the present invention with a latch in a closed position (and the latch in an open position shown in dashed lining)
Figure 6:
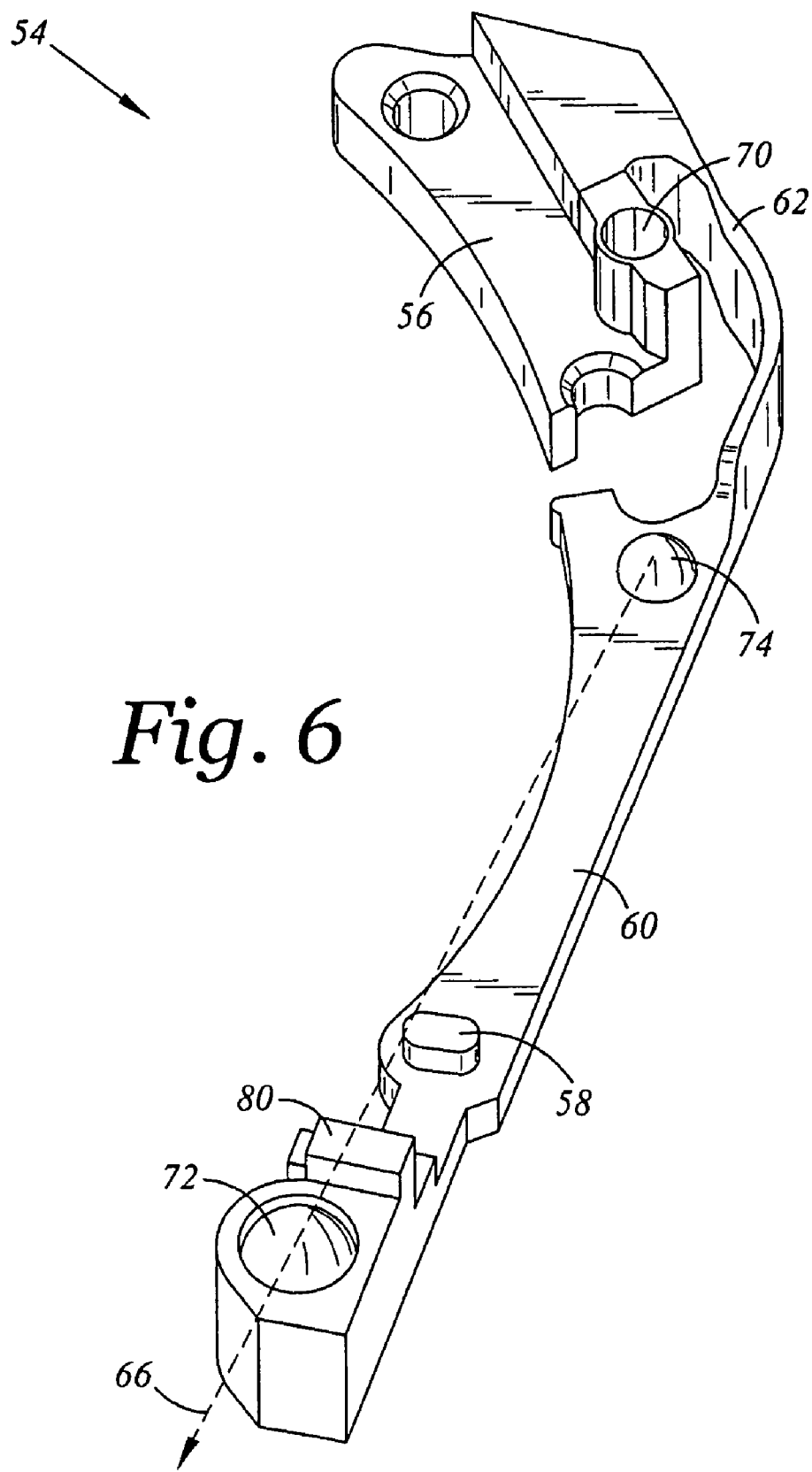
FIG. 6 is an enlarged top perspective view of a latch of an embodiment of the present invention.
Figure 7:
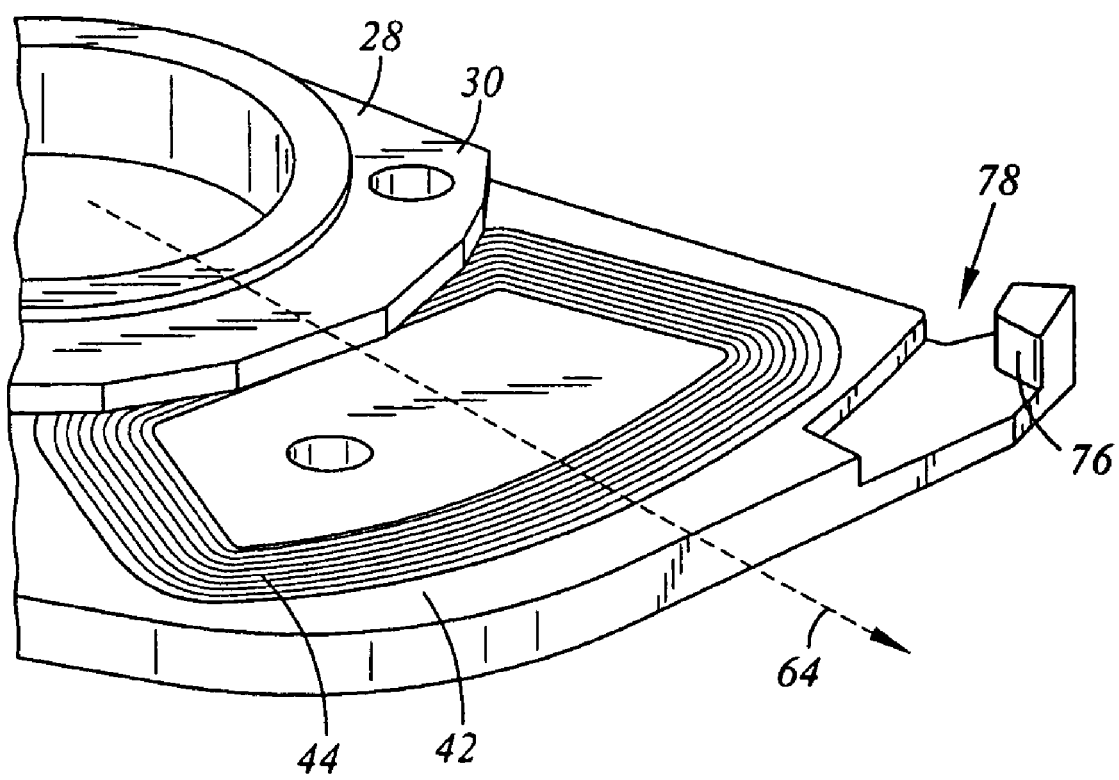
FIG. 7 is an enlarged bottom perspective view of a portion of an actuator of an embodiment of the present invention.
Figure 8:
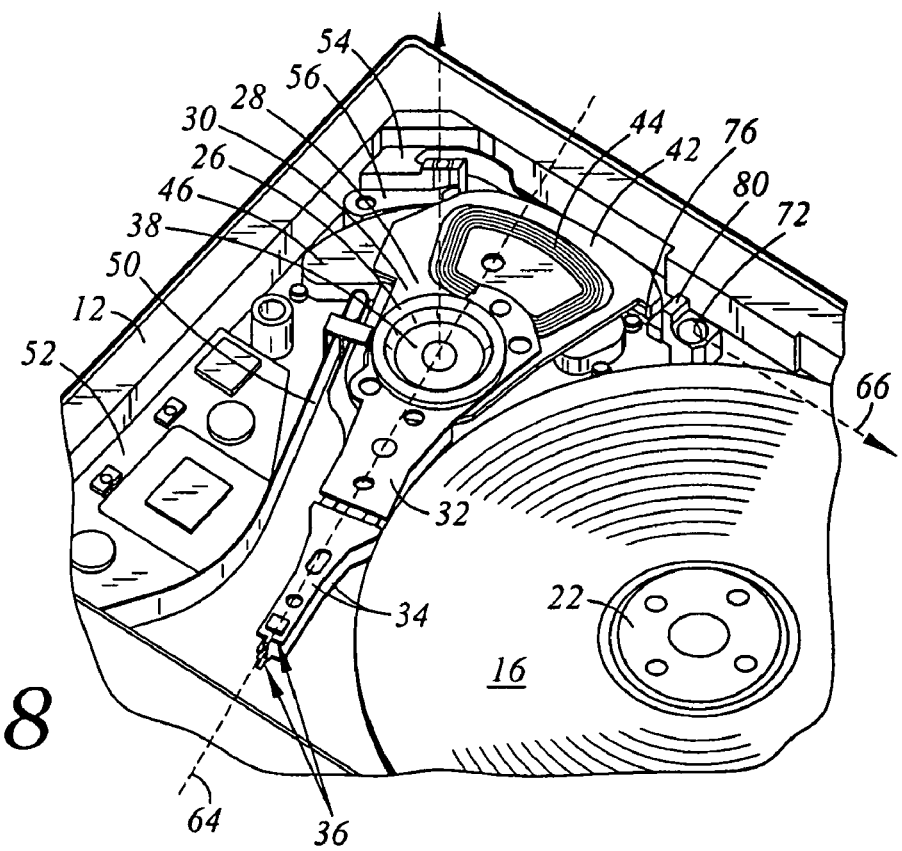
FIG. 8 is an enlarged top perspective view of a portion of a disk drive of an embodiment of the present invention with a latch in an open position and an actuator in a parked position.
Figure 9:
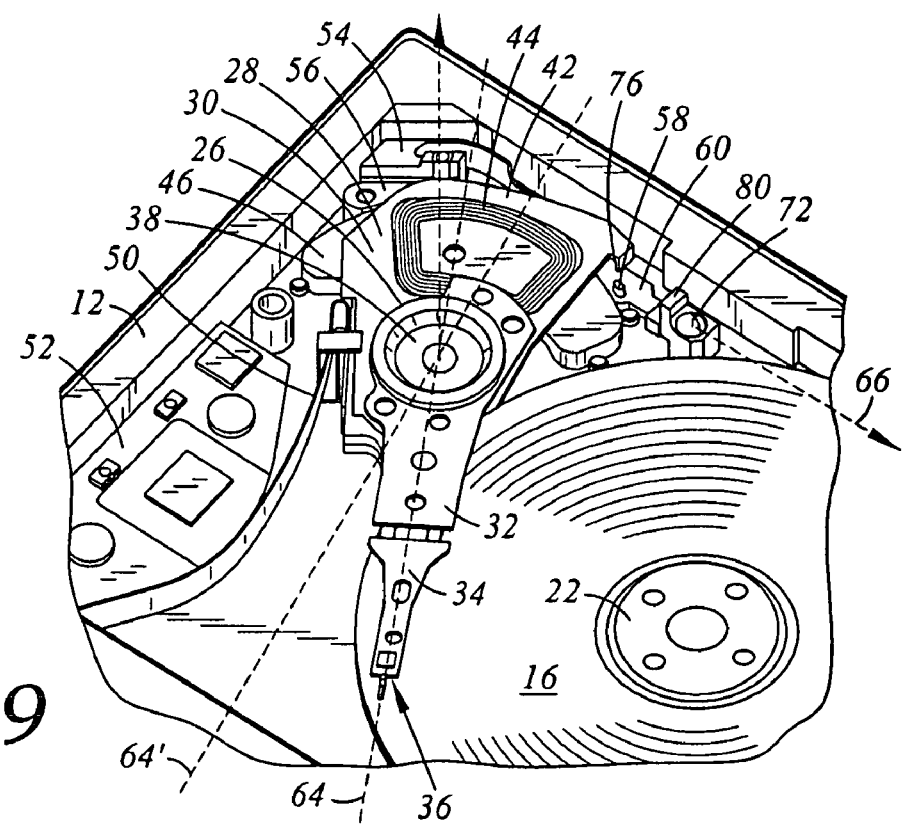
FIG. 9 is an enlarged top perspective view of a portion of the disk drive similar to that of FIG. 8, however, with the actuator in an operable position.

As will be discussed in detail below, the disk drive 10 includes a latch 54. Referring additionally to FIG. 2 there is depicted an enlarged top perspective view of a portion of the disk drive 10 with the latch 54 in an open position (the actuator 28 is removed from view in this figure for ease of viewing the latch 54). FIG. 3 is an enlarged top perspective view of a portion of the disk drive 10 with the latch 54 in a closed position (the actuator 28 is removed from view in this figure for ease of viewing the latch 54). FIG. 4 is an enlarged top plan view of a portion of the disk drive 10 with the latch 54 in a closed position and the latch 54 in an open position shown in dashed lining (the actuator 28 also removed from view in this figure for ease of viewing the latch 54). In addition, FIG. 5 is an enlarged top perspective view of a portion of the latch 54 and a portion of the actuator 28 with the latch 54 in a closed position and the latch 54 in an open position shown in dashed lining. FIG. 6 is an enlarged top perspective view of the latch 54, and FIG. 7 is an enlarged bottom perspective view of a portion of the actuator 28. FIG. 8 is an enlarged top perspective view of a portion of the disk drive 10 with the latch 54 in an open position and the actuator 28 in a parked position, and FIG. 9 is a similar view, however, with the actuator 28 in an operable position.

In the embodiments of FIGS. 1-9, the disk drive 10 includes the disk drive base 12. The disk drive 10 further includes the actuator 28 that is rotatably coupled to the disk drive base 12. The actuator 28 has the axis of rotation 40. The disk drive 10 further includes the latch 54. The latch 54 includes a fixed portion 56 that is firmly coupled to the disk drive base 12. The latch 54 further includes a latching portion 58. The latch 54 further includes a latch arm portion 60 connecting the latching portion 58 to the fixed portion 56. The latch arm portion 60 includes a hinge region 62. The latch arm portion 60 is thinner in a direction normal to the axis of rotation 40 in the hinge region 62 than the latch arm portion 60 is outside of the hinge region 62. The latch arm portion 60, the latching portion 58, and the fixed portion 56 all being a single component having material continuity rather than being an assembly of sub-components.

According to various embodiments, the disk drive 10 may further comprise a latch post 68 extending from the disk drive base 12. The latch post 68 and the disk drive base 12 may be a single component having material continuity as opposed to being an assembly of sub-components. As mentioned above, the fixed portion 56 is firmly coupled to the disk drive base 12. In this regard, the latch 54 may be attached to the disk drive base 12 via the fixed portion 56 being coupled to the latch post 68. The fixed portion 56 may include a post hole 70 as shown in enlarged view of the latch 54 of FIG. 7. The fixed portion 56 may be press-fit attached to the latch post 68. Other methods of attachment of the fixed portion 56 to the disk drive base 12 may be utilized such as through the use of fasteners or an adhesive for examples.

As mentioned above, the latch arm portion 60, the latching portion 58, and the fixed portion 56 are all a single component having material continuity rather than being an assembly of sub-components. This can serve to reduce the number of components and avoid assembly of such components to enable the hinging functionality in this embodiment. According to various embodiments, the latch arm portion 60, the latching portion 58, and the fixed portion 56 may comprise a plastic material. Such a plastic material may be for example polyoxymethylene (POM) which has been used internally in disk drive designs in the context of head gimbal assembly ramp applications, due to POM's acceptable dimensional stability, relatively low friction, acceptable out-gassing properties, and acceptable cost.

The latch arm portion 60 may have a height in the hinge region 62 in a direction parallel to the axis of rotation 40 and a nominal thickness in the hinge region 62 in a direction orthogonal to the axis of rotation 40. The height may be at least five times the nominal thickness. With the height being greater than the nominal thickness, it is contemplated that the hinge region 62 may flex so as to facilitate the movement of the latching portion 58 relative to the fixed portion 56. The hinge region 62 of the latch arm portion 60 may have substantially greater bending stiffness about an axis parallel to the axis of rotation 40 than about an axis normal to the axis of rotation 40. As such, the latch 54 may be configured to be restricted to move in a plane orthogonal to the axis of rotation 40.

As mentioned above, the latch 56 includes the latching portion 58 as best seen in FIGS. 5 and 6. The latching portion 58 may be in the shape of a pin. In the embodiment shown, the latching portion 58 is in a shape of a pin which is a relatively stubby protrusion with an oval cross section. The latching portion 58 is integrally formed with the latch arm portion 60. The latching portion 58 may be at a closer radial distance from the axis of rotation 40 with the latch 54 in the open position (as shown in FIG. 2) than it is in a closed position (as shown in FIG. 3).

The latch 54 may have a biased position of the latch arm portion 60. In this regard, in the embodiment shown, the latch 54 may include a biasing element 74 coupled to the latch arm portion 60. Magnetic interaction with the biasing element 74 results in a biasing force. The biasing element 74 may comprise a magnetic metal, such as a steel ball bearing (e.g. 400 series stainless steel). In this regard, the biasing element 74 may be configured to magnetically interact with the VCM magnet 46 disposed adjacent the actuator 28. As best seen in FIG. 2, with this configuration, the latch arm portion 60 is biased towards the actuator 28 so as to position the latch 54 in the open position. It is contemplated that the latch 54 could be configured in another embodiment to be biased in a closed position. Other biasing techniques for the latch 54 may be implemented. For example, the latch 54 may be pre-bent to have a pre-load in a given direction. Thus, the latch 54 may be pre-bent such that its normal resting state would tend to interfere with the VCM magnet 46 and would require the latch 54 to be bent in an opposing direction of bend in order to facilitate installation.

To facilitate the latching function of the latch 54, the latching portion 58 is configured to contact the actuator 28 when the latch 54 is in the closed position. In this regard, in the particular embodiment shown, the actuator 28 includes a latch contact element 76 and a channel 78, as best seen in the enlarged views of FIGS. 5 and 7. The latching portion 58 may be disposed within the channel 78 during rotation of the actuator 28 with the latch 54 in an open position.

The latch arm portion 60 may have a latch arm longitudinal axis 66 generally extending through its length. As seen in FIGS. 3 and 4 for reference purposes, there is indicated a latch arm longitudinal axis 66' as indicating the position of the latch arm longitudinal axis 66 in the open position. The amount of angular movement between the open and closed positions of the latch 54 may be on the order of 5 to 6 degrees for example. It is preferable that such angular motion is well within the range of elastic deformation of the hinge region 62.

As seen in FIG. 8, the latch 54 is in its biased open position and the actuator 28 is shown in a parked position. The parked position is the disposition that the actuator 28 is configured to come to rest when not performing read or write operations. In FIG. 9, the actuator 28 is shown as being rotated in a counterclockwise direction in an operable position with the head 36 over the disk 16. The latch contact element 76 does not contact the latch portion 58, as the latch contact element 76 is moved past the latch portion 58 into the operable position as shown. The actuator 28 includes an actuator longitudinal axis 64 which is extends generally along the actuator arms 32. As shown in FIG. 9, for reference, there is indicated the actuator longitudinal axis 64' as is was previously positioned with the actuator 28 in the parked position.

However, with the latch 54 in the closed position, the latching portion 58 may be radially beyond the channel 78 in relation to the axis of rotation 40. In this regard, rotation of the actuator 28 in the direction of the latching portion 58 with the latch 54 in the closed position (as shown in FIG. 5) results in contact between the latching portion 58 and the latch contact element 76. Superimposed in FIG. 5, for reference purposes there is in indicated in phantom lining the latch 54' and the latching portion 58' as indicated in a latch open position.

The latching portion 58 may be of various shapes and sizes and be configured to engage the actuator 28 in alternate ways. For example, the latching portion 58 need not be configured to be positioned within any channel. In this regard, rather than contacting the latch contact element 76 as shown, latching portion 58 could be configured to contact a hook or tang of the actuator 28. As such, it is only required that the latching portion 58 be positioned along a path of a portion of the actuator 28 such that contact between the latching portion 58 and such portion can occur while the latch 54 is in the closed position.

It is contemplated that the disk drive 10 may be exposed in external forces, such as a shock event. Where the actuator 28 is in the parked position, such an external force may result in a rotational acceleration having a component about an axis that is parallel to the axis of rotation 40. Where the direction of such rotational acceleration component in such that the disk drive 10 rotates in a clockwise direction (as seen in the view of FIG. 1), the actuator 28 would tend to rotate in an opposite direction. Rotation of the actuator 28 in such a direction would result in the heads 36 being undesirably moved over the disks 16 in an uncontrolled manner.

However, the latch 54 is configured to move from its biased open position to the closed position upon being subjected to the very same rotational acceleration component that would induce the actuator 28 to rotate. In this regard, the latch 54 is characterized by the latch arm portion 60 extending away from the fixed portion 56 with the hinge region 62 there between. It is contemplated that the latch arm portion 60 has a degree of mass associated with it that would tend to cause the latch arm portion 60 to flex about the hinge region 62. Such a configuration may be referred to as an inertial latch configuration.

The latch 54 further may include a mass element 72. The mass element 72 is formed of a material having a density greater than the fixed portion 56, the latch arm portion 60, and the latching portion 58. In this regard, the relative sensitivity of the movement of the latch arm portion 60 to move upon being subjected to a rotational acceleration may be adjusted. The inclusion and/or amount of mass of the mass element 72 may vary depending upon the amount of such sensitivity.

The latch 54 may further include a crash stop 80. The crash stop 80 may be integrally formed with the latch arm portion 60. As such, the crash stop 80, the hinge region 62, the latch arm portion 60, the latching portion 58, and the fixed portion 56 may all be a single component having material continuity rather than being an assembly of sub-components. The crash stop 80 is positioned to contact the actuator 28 upon rotation of the actuator 28 in an extreme rotational position. In the embodiment shown, where the actuator 28 is rotated beyond the disk 16 adjacent the outer diameter 20, the actuator 28 is prevented from further movement by contact with the crash stop 80.

What is claimed is:

1. A disk drive comprising:
  a disk drive base;
  an actuator that is rotatably coupled to the disk drive base, the actuator having an axis of rotation; and
  a latch including:
  a fixed portion that is firmly coupled to the disk drive base;
  a latching portion configured to contact and latch the actuator with the latch in a closed position; and
  a latch arm portion connecting the latching portion to the fixed portion, the latch arm portion including a hinge region, the latch arm portion being thinner in a direction normal to the axis of rotation in the hinge region than the latch arm portion is outside of the hinge region, the latch arm portion, the latching portion, and the fixed portion all being a single component having material continuity rather than being an assembly of sub-components; wherein the latching portion is at a closer radial distance from the axis of rotation with the latch in an open position than it is in a closed position.

2. The disk drive of claim 1 wherein the fixed portion, the latching portion, and the latch arm portion comprise a plastic material.

3. The disk drive of claim 1 wherein the latch arm portion has a height in the hinge region in a direction parallel to the axis of rotation and a nominal thickness in the hinge region in a direction orthogonal to the axis of rotation, the height being at least five times the nominal thickness.

4. The disk drive of claim 1 wherein the hinge region of the latch arm portion has substantially greater bending stiffness about an axis parallel to the axis of rotation than about an axis normal to the axis of rotation.

5. The disk drive of claim 1 further comprising a VCM magnet disposed adjacent the actuator, wherein the latch includes a biasing element coupled to the latch arm portion, the biasing element magnetically interacting with the VCM magnet resulting in a biasing force on the latch arm portion.

6. The disk drive of claim 1 wherein the latching portion is in the shape of a pin that protrudes from the latch arm portion in a direction parallel to the axis of rotation of the actuator.

7. The disk drive of claim 6 wherein the actuator further comprises an actuator coil that is supported by a coil support that has a channel, the latching portion being disposed within the channel during rotation of the actuator with the latch in an open position.

8. The disk drive of claim 7 wherein the latching portion is radially beyond the channel in relation to the axis of rotation with the latch in a closed position.

9. The disk drive of claim 1 further comprising a latch post extending from the disk drive base, the fixed portion being coupled to the latch post.

10. The disk drive of claim 9 wherein the fixed portion is press-fit attached to the latch post.

11. The disk drive of claim 9 wherein the latch post and the disk drive base are a single component having material continuity rather than being an assembly of sub-components.

12. The disk drive of claim 1 wherein the latch further includes a mass element, the mass element being formed of a material having a density greater than the fixed portion, the latch arm portion, and the latching portion.

13. The disk drive of claim 1 wherein the latch further includes a crash stop, the actuator contacting the crash stop with the actuator in an extreme rotational position, the contact with the crash stop preventing further movement of the actuator beyond the extreme rotational position.

14. The disk drive of claim 13 wherein the crash stop, the hinge region, the latch arm portion, the latching portion, and the fixed portion are all a single component having material continuity rather than being an assembly of sub-components.

* * * * *